US010862885B2

(12) United States Patent
Zhang et al.

(10) Patent No.: US 10,862,885 B2
(45) Date of Patent: Dec. 8, 2020

(54) DEVICE IDENTIFICATION

(71) Applicant: FORESCOUT TECHNOLOGIES, INC., San Jose, CA (US)

(72) Inventors: Yang Zhang, Fremont, CA (US); Siying Yang, Cupertino, CA (US)

(73) Assignee: ForeScout Technologies, Inc., San Jose, CA (US)

( * ) Notice: Subject to any disclaimer, the term of this patent is extended or adjusted under 35 U.S.C. 154(b) by 97 days.

(21) Appl. No.: 15/463,227

(22) Filed: Mar. 20, 2017

(65) Prior Publication Data

US 2018/0270229 A1 Sep. 20, 2018

(51) Int. Cl.
| | |
|---|---|
| *H04L 29/06* | (2006.01) |
| *H04W 12/06* | (2009.01) |
| *G06F 21/44* | (2013.01) |
| *H04W 12/00* | (2009.01) |
| *H04W 12/12* | (2009.01) |

(52) U.S. Cl.
CPC .......... *H04L 63/0876* (2013.01); *G06F 21/44* (2013.01); *H04L 63/10* (2013.01); *H04L 63/102* (2013.01); *H04L 69/22* (2013.01); *H04W 12/06* (2013.01); *H04L 63/1433* (2013.01); *H04W 12/00512* (2019.01); *H04W 12/12* (2013.01)

(58) Field of Classification Search
CPC .................................................. H04L 63/0876
USPC ........................................................ 726/4
See application file for complete search history.

(56) References Cited

U.S. PATENT DOCUMENTS

| | | | |
|---|---|---|---|
| 8,392,712 B1* | 3/2013 | Wilson .................. | H04W 12/06 713/175 |
| 9,402,177 B2* | 7/2016 | Hawkes .......... | H04W 12/04031 |
| 10,652,116 B2* | 5/2020 | Zhang ............... | H04W 12/0027 |
| 2007/0297349 A1* | 12/2007 | Arkin ..................... | H04L 12/66 370/255 |
| 2013/0139263 A1 | 5/2013 | Beyah et al. | |
| 2014/0122386 A1 | 5/2014 | Nahum et al. | |
| 2016/0155128 A1* | 6/2016 | Desai ................. | G06Q 20/4016 705/44 |
| 2017/0262523 A1* | 9/2017 | Epstein .................... | H04L 67/12 |
| 2018/0176262 A1* | 6/2018 | Kavi ..................... | H04L 63/205 |
| 2018/0234326 A1* | 8/2018 | Swierk .................... | H04L 43/16 |
| 2018/0270229 A1* | 9/2018 | Zhang .................. | H04W 12/06 |
| 2019/0073046 A1* | 3/2019 | Caruana ................ | G06F 3/0338 |

OTHER PUBLICATIONS

Int'l Search Report and Written Opinion of the ISA/EP in PCT/US2018/020291 dated May 3, 2018; 16 pgs.

Arora et al., "Big Data Analytics for Classification of Network Enabled Devices" 2016 30th International Conference on Advanced Information Networking and Applications Workshops (WAINA), IEEE, Mar. 23, 2016, pp. 708-713.

(Continued)

*Primary Examiner* — Harris C Wang
(74) *Attorney, Agent, or Firm* — Womble Bond Dickinson (US) LLP

(57) ABSTRACT

Systems, methods, and related technologies for device identification are described. In certain aspects, packet data associated with a device can be analyzed and a score determined. The score and the threshold can be compared to determine a device identification for the device.

10 Claims, 5 Drawing Sheets

(56) References Cited

OTHER PUBLICATIONS

Miettinen et al., "IoT Sentinel: Automated Device-Type Identification for Security Enforcement in IoT", arxiv.org, Dec. 13, 2016.
Uluagac et al., "A Passive Technique for Fingerprinting Wireless Devices with Wired-side Observations" 2013 IEEE Conference on Communications and Network Security (CNS), IEEE, Oct. 14, 2013, pp. 305-313.

* cited by examiner

DEVICE IDENTIFICATION

TECHNICAL FIELD

Aspects and implementations of the present disclosure relate to network monitoring, and more specifically, to device identification based on information available via a communication network.

BACKGROUND

As technology advances, the number and variety of devices that are connected to communications network are rapidly increasing. This rapid increase in number and variety of devices can make it difficult to identify devices as new devices are frequently being introduced. The identification of devices connected to a network can be useful for monitoring and securing the communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
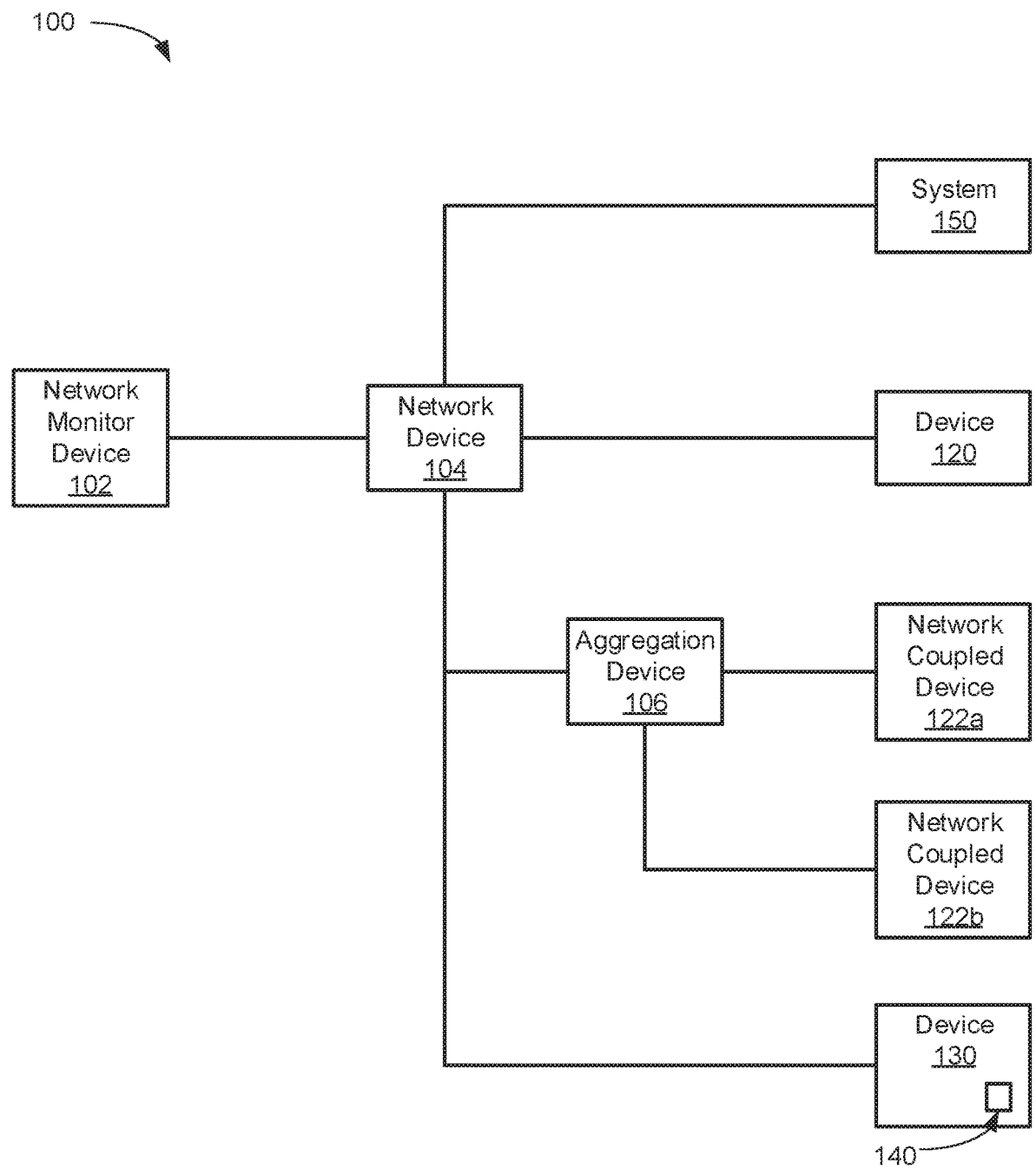
FIG. 1 depicts an illustrative communication network in accordance with one implementation of the present disclosure.

Aspects and implementations of the present disclosure are directed to device identification. The systems and methods disclosed can be employed with respect to network security, among other fields. More particularly, it can be appreciated that access to network resources by unauthorized devices is a significant and growing problem. At the same time, the proliferation of network-connected devices (e.g., smartphones, tablets, wearable devices, etc.) can make it difficult to effectively manage access to network resources for those users or devices that are authorized. Accordingly, described herein in various implementations are systems, methods, techniques, and related technologies, that enable the ongoing monitoring of network devices and activity and provide the ability to control access to network resources (e.g., by defining and employing access policies which dictate the types of devices that are or are not authorized to access certain network resources, the circumstances under which such access is or is not permitted, etc.).

In order to effectively implement network access policies, it may be advantageous to identify, classify, or otherwise determine various aspects, features, or characteristics of devices that are connected to a network or what the devices are (or are not) doing on the network. While it may be possible to determine certain types of identifying information (e.g., IP address, MAC address, etc.) with respect to many types of network-connected devices (e.g., those connected via a Ethernet connection or Wi-Fi™), in certain scenarios it may be difficult to determine with a high degree of accuracy certain characteristics of a particular device (e.g., whether such a device is an access point) and thereby identify the device.

The increase in the number and variety of devices, in particular "Internet of Things (IoT)" devices, has created an increasing need to understand, monitor, and control all connected devices. IoT systems and devices are being used for various applications and locations ranging from households to large industrial environments on an increasingly large scale. It can be hard to protect a device that is not visible on the network and if the identity of the device is unknown. Protection can be particularly important when it comes to IoT devices which can be very limited in terms of security functions that a user can enable on the device itself.

Identification of a device enables monitoring, controlling, and applying different security policies on different device groups thereby allowing support for different security techniques. The identification can thus be used to apply security protocols in order to achieve end-to-end security for an IoT system. The present disclosure describes, among other things, systems and methods for device identification (e.g., IoT devices) using multiple sources of device information.

Further, it can be hard to identify a device based on MAC address, protocol, and hypertext transfer protocol (HTTP) user-agent strings. Such techniques are particularly limited and narrow in their identification abilities and in many cases may be unable to identify devices. These techniques further result in frequent false negatives and false positives and thus have low accuracy. For example, two different IoT devices that communicate using the same protocol (e.g., hypertext transfer protocol (HTTP)) can be completely different devices. As a result it can be difficult to identify devices.

Currently there is no reliable methodology for device identification. Current methodologies are based on an agent running on the device or based on a single property, such as, HTTP user-agent, MAC address, or a port scan. These identifications are not reliable and have many disadvantages. For example, in many scenarios, it is not allowed or even possible to deploy an agent on a device. Moreover, for traditional traffic inspection, the HTTP payload may be modified to confuse device identification.

Identification based on MAC address can be unreliable for numerous reasons. The identification based on MAC address will fail when "MAC randomization" techniques are used (e.g., by smartphones). MAC addresses may also not be useful for identifying different types of devices. For example, if a company manufactures components that include Ethernet to serial interfaces, those components may be used in a variety of products. The manufacture may be assigned a particular MAC address range and, as a result a variety of devices, may have MAC addresses within the manufacturer's range. For example, a medical device and a toaster may have MAC addresses within the manufacturer's MAC address range because each has an Ethernet interface made by the manufacturer. The MAC addresses with the manufacturer's range thus cannot be used for accurate identification because of the variety of devices that may be in the range.

A port scan may not be useful, in particular, when there is no response from devices. There are other methodologies that depend on an agent running on devices to collect device information which becomes useless because most devices such sensors or industrial devices that do not allow installation of agent.

Embodiments of the present disclosure provide a reliable device identification technique in a more accurate and fine-grained manner (e.g., based on network traffic analysis). The device identification can be based on multiple pieces of information (e.g., packet analysis, port analysis, and advanced detection) thereby providing more reliable and accurate (e.g., reduced false positives) device identification than current methodologies. The device identification can occur at the operating system level, the vendor level, and model from vendor or product level. A confidence score may be calculated at each level to determine the reliability or accuracy of the identification. Additional information may be gathered (e.g., using port analysis, heuristics, from a $3^{rd}$ party system, etc.) to determine and improve a confidence score (e.g., a confidence score based on packet analysis) thereby increasing accuracy. The device identification enables security policies to be applied accurately and as intended. Applying a security policy to an unidentified device can be difficult (e.g., ineffective) and may result in unintended consequences. For example, attempting to apply a security policy to limit network access (e.g., based on blocking two particular ports) to an unidentified and compromised device may result in network access of the compromised device not being limited (e.g., others ports may not be blocked).

Embodiments may perform device identification based on network traffic analysis. Multiple identification solutions are integrated, optimized, and combined with advanced detection heuristics and algorithms which can provide reliable device identification and fine-grained device identification. The logic of one or more identification engines can be combined with signatures, in addition to the confidence score algorithm which can be used separately as a software package without affecting the existing software architecture thereby providing flexibility and extensibility.

Accordingly, described herein in various implementations are systems, methods, techniques, and related technologies, which enable the identification of devices that are communicatively coupled to a network. As described herein, various pieces of information can be collected from network traffic about the device to be identified.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

In some embodiments, additional sources of device information are used to increase device identification accuracy. If an agent is present on the device (e.g., a personal computer (PC) or server), the agent can collect and provide detailed device information for device identification. If an agent is not present, e.g., on a mobile device, data from other systems, e.g., a mobile device management (MDM) system, firewall system, or switch system can be used to gather additional information.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be configured for a variety of tasks including device identification (e.g., identification of devices 120 and 130 and network coupled devices 122a-b). Network monitor device 102 may be a computing system, network device (e.g., router, firewall, an access point), network access control (NAC) device, intrusion prevention system (IPS), intrusion detection system (IDS), deception device, cloud-based device, virtual machine based system, etc.

Network monitor device 102 can function as a device identification system that monitors devices on network 100 (e.g., continuously, at a regular interval, upon a device being added to a network, etc.) to create a device information table for each of the devices on network 100. In some embodiments, network monitor device 102 is configured to identify a device based on three-tiers of information including a general tier (e.g., operating system), to more specific (e.g., vendor), and to very specific (e.g., product of one vendor).

In one embodiment, the identification of a device by network monitor device 102 starts with analyzing one or more packets (e.g., by packet engine 204). Network monitor device 102 is different from existing methodologies that reply on a single simple condition. Network monitor device 102 can use multiple pieces of information and algorithms to determine a confidence score for information on each tier. The packet analysis by network monitor device 102 can include accessing information including the MAC address (e.g., from layer 2), protocol information (e.g., from layer 3 and layer 4), payload (e.g., from layer 7), and dynamic host control protocol (DHCP) patterns. The information accessed during the packet analysis can used for fingerprint analysis (e.g., by an identification engine 240) for determining of a confidence score.

As the confidence score reaches a threshold (e.g., an adjustable threshold), the network monitor device 102 is able to determine information at each tier. If information for each of the three tiers is determined, network monitor device 102 can stop the device identification process and report the device identification results.

If the packet analysis cannot provide information associated with a confidence score above the threshold, the device monitor device 102 can perform a port analysis (e.g., using port engine 220). The port analysis can include actively scanning the device to be identified for open ports. The results of the port analysis can be used to further update the device information table and used to calculate an updated confidence score. This confidence score can then be compared to the threshold to determine whether the confidence score meets or exceeds the threshold and if so, the device identification process may output the device identification results.

If the updated confidence score based on the port analysis does not meet the threshold, then network monitor device 102 can run advanced detection processes (e.g., using advanced detection engine 230). The advanced detection processes can include heuristics and machine learning and training. These advanced detection processes can be based on correlation among multiple packets including packet sequence, packet size, and packet interval or on entropy.

The logic of the advanced detection processes can be updated on-the-fly. The advanced detection logic combined with fingerprint signatures (e.g., accessed by identification engine 240) can be updated (e.g., pushed) to network monitor device 102 without negatively affecting the functions of network monitor device 102.

Network monitor device 102 may communicate with different network devices and security products to access information that may be used for identification of devices coupled to network 100. The data accessed may then be processed, normalized, and analyzed to update device information (e.g., stored in device information database 242). Network monitor device 102 may be communicatively coupled to the network device 104 in such a way as to receive network traffic flowing through the network device 104 (e.g., port mirroring).

The identification of devices by network monitor device 102 may be based on a combination of one or more pieces of information including traffic analysis, information from external or remote systems (e.g., system 150), information from an agent (e.g., agent 140), communication (e.g., querying) an aggregation device (e.g., aggregation device 106), and querying the device itself, which are described further herein. Network monitor device 102 may be configured to use one or more application programming interfaces (APIs) to communicate with aggregation device 106, device 120, device 130, or system 150.

In some embodiments, a device classification heuristic may be used to classify devices into different groups. The groups may be predefined (e.g., default groups that are part of the heuristic) or created dynamically (e.g., on-the-fly after network traffic is received). For example, a group may be dynamically created for a device classification based on the device name based on the device classification not matching predefined groups. The groups may be based on types of devices. For example, one group may be for devices that have a particular operating system, a second group for medical devices (e.g., a magnetic resonance imaging (MRI) device, a X-ray device, or computed tomography (CT) scanning device), and a third group for operational technology devices (e.g., device configured to detect or cause changes in physical processes through direct monitoring or control of physical devices such as valves, pumps, etc.). The identification of devices into groups may allow visual organization of devices within a graphical user interface. Security policies may further be applied on a group basis. Each group may have subgroups. For example, a medical device group could have a subgroups for MRI devices, X-ray machines, and automated dispensing machines.

The data for identification of a device may be updated periodically or as more useful device information becomes available thereby allowing updated, more accurate, and fine-grained device identification.

Device 130 can include agent 140. The agent 140 may be a hardware component, software component, or some combination thereof configured to gather information associated with device 130 and send that information to network monitor device 102. The information can include the operating system and version, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), MAC address, processor utilization, unique identifiers, computer name, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140.

System 150 may be external, remote, or third party system (e.g., separate) from network monitor device 102 and may have information about devices 120 and 130 and network coupled devices 122a-b. System 150 may be a vulnerability assessment (VA) system, a threat detection (TD) system, a mobile device management (MDM) system, a firewall (FW) system, a switch system, or an access point system. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus.

The vulnerability assessment (VA) system may be configured to identify, quantify, and prioritize (e.g., rank) the vulnerabilities of a device. The VA system may be able to catalog assets and capabilities or resources of a device, assign quantifiable value (or at least rank order) and importance to the resources, and identify the vulnerabilities or potential threats of each resource. The VA system may provide the aforementioned information for use by network monitor 102.

The advanced thread detection (ATD) or thread detection (TD) system may be configured to examine communications that other security controls have allowed to pass. The ATD system may provide information about a device to be classified including, but not limited to, source reputation, executable analysis, and threat-level protocols analysis.

The mobile device management (MDM) system may be configured for administration of mobile devices, e.g., smartphones, tablet computers, laptops, and desktop computers. The MDM system may provide information about mobile devices managed by MDM system including applications, data, and configuration settings of the mobile devices and activity monitoring. MDM system may be used get detailed mobile device information which can then be used for identification.

The firewall (FW) system may be configured to monitor and control incoming and outgoing network traffic based on security rules. The FW system may provide information about a device to be identified including security rules related to the device to be identified and network traffic of the device to be identified.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., which may be used to identify a device. The switch or AP system may have one or more interfaces for communicating with IoT devices or other devices (e.g., ZigBee™ Bluetooth™, etc.), as described herein.

The VA system, ATD system, and FW system may be accessed to get vulnerabilities, threats, and user information of the device to be identified in real-time which can then be used to determine accurate identification. Which information sources and how many information sources have data on a device to be identified can be used as a factor for identification. For example, a VA system, an ATD system, a FW system, or a combination thereof can report threats that are triggered on a device (e.g., a managed device). If each of the threats reported for a device are Microsoft Windows XP™ related threats, then this information can be used to accurately identify the device as a generally Microsoft Windows™ device or more specifically to be a Microsoft Windows XP™ device.

Aggregation device 106 may be configured to communicate with network coupled devices 122a-b and provide network access to network coupled devices 122a-b. Aggregation device 106 may further be configured to provide information (e.g., operating system, device names, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the type of devices on the network do not change often).

The names of the devices may be used by network monitor device 102 in making an identification determination. For example, the log information may include device names (e.g., LED_bulb_1 and LED_strip_1). The device names may further be used to identify a device into a subgroup. For example, a device name of LED_bulb_1 may be used to identify a device into a light bulb subgroup of a lighting group and a device name of LED_strip_1 may be used to identify a device into a light strip subgroup of a lighting group.

Network monitor device 102 may further use device behavior for making an identification determination. The behavior may include the operating schedule of the device. For example, where devices are turned on each morning at 6:00 am or within an hour of sunrise every day, such information may be used to identify a device as a light bulb, where the device is communicatively coupled to a light control bridge device.

Network monitor device 102 may further use clustering information (e.g., device information similarities) in determining a device identification. For example, if the first device is identified as a light bulb and a second device has an similar IP address (e.g., in the same IP address range or IP address that is only a few addresses away) or similar on/off time, then the second device may be identified a lighting device.

Network monitor device 102 may further use location or proximity information or adjacency heuristics to identify a device. For example, if a refrigeration device was challenging to identify, the fact that is it close to another network coupled device, e.g., an oven, in the kitchen, may be used to accurately identify the refrigerator. As another example, if a Blu-ray device was challenging to identify, information that the Blu-ray device was close to a video game console and a television may be used to accurate identify the Blu-ray device.

Figure 2:
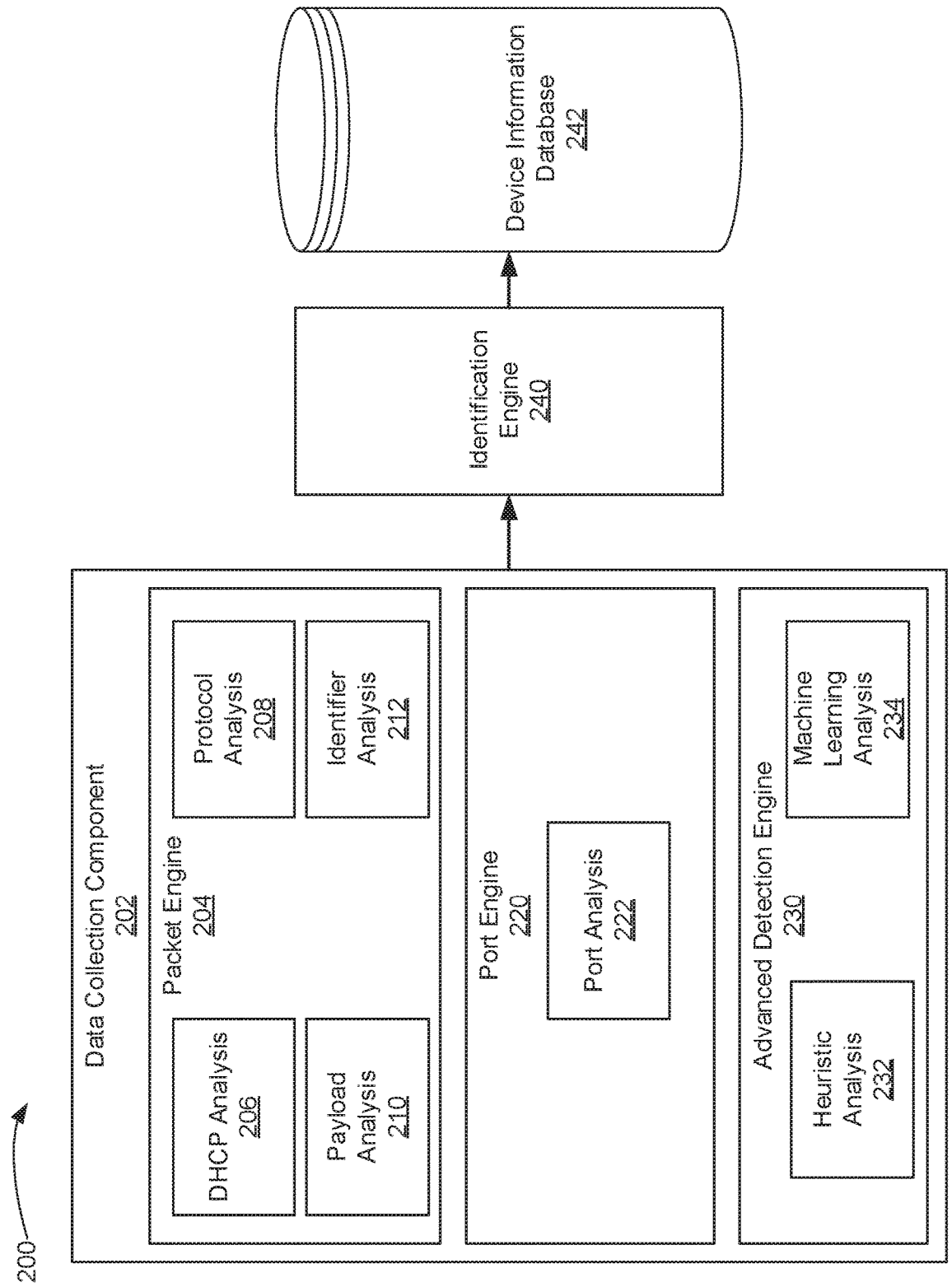
FIG. 2 depicts illustrative components of a system for device identification in accordance with one implementation of the present disclosure.

FIG. 2 illustrates example components used by various embodiments. Although specific components are disclosed in system 200, it should be appreciated that such components are examples. That is, embodiments of the present invention are well suited to having various other components or variations of the components recited in system 200. It is appreciated that the components in system 200 may operate with other components than those presented, and that not all of the components of system 200 may be required to achieve the goals of system 200.

FIG. 2 depicts illustrative components of a system 200 for device identification in accordance with one implementation of the present disclosure. System 200 includes a data collection component 202, identification engine 240, and device information database 242. In some embodiments, system 200 is performs device identification when a device joins a network (e.g., network 100). For example, system 200 may initiate identification of a device based upon detection of the device joining the network.

Data collection component 202 can collect and analyze data for device identification. Data collection component 202 includes a packet engine 204, a port engine 220, and an advanced detection engine 230.

Packet engine 204 is configured to access network traffic (e.g., passively) and analyze network traffic. Packet engine 204 includes a DHCP analysis component 206, a protocol analysis component 208, a payload analysis component 210, and an identifier analysis component 212. The passive analysis by the packet engine 204 may be performed by accessing packets through sniffing network traffic or port mirroring (e.g., receiving packets from a network switch). The passive analysis by the packet engine 204 allows packet analysis of devices (e.g., medical devices) that are sensitive to probing or actively sending packets to the devices and analyzing the responses.

DHCP analysis component 206 can access a variety of parameters of one or more DHCP packets including an option parameter list or request parameter list and the DHCP operating system parameter. For example, the DHCP option parameters examined can include 1-20 and 45. The DHCP analysis component 206 can be configured to determine different device types and operating systems based on the number of the options in the DHCP traffic of a device to be identified. DHCP analysis component 206 may use unique patterns in the DHCP options, parameters, or combination thereof to identify operating system or device type based on DHCP traffic analysis.

For example, from a DHCP request of one or more of packets, two fields may be used to for indicators of device identity: 1) the vendor class identifier can indicate that the device is a MSFT5.0 system and 2) the parameter request list may be [1 (Subnet Mask), 15 (Domain Name), 3 (Router), 6 (Domain Name Server), 44 (NetBIOS over TCP/IP Name Server), 46 (NetBIOS over TCP/IP Node Type), 47 (NetBIOS over TCP/IP Scope), 31 (Perform Router Discovery), 33 (Static Route), 121 (Classes Static Route), 249 (Private/Classes Static Route (Microsoft), 43 (Vendor-Specific Information), and 252 (Private/Proxy autodiscovery)] which is unique to Windows™ operating system. These two conditions may be strongly indicative that a device to be identified is a Windows™ device.

Protocol analysis component 208 accesses portions of one or more packets associated with a device to be identified that are associated with the communication protocol to be used or being used. In some embodiments, protocol analysis component 208 may determine the protocol being used based on the port specified in one or more packets. For example, ports 80 or 8080 may indicate that the HTTP protocol is being used, port 22 may indicate that the secure shell (SSH) protocol is being used, and port 23 may indicate that the telnet protocol is being used, etc. Protocol analysis component 208 may also access a banner (e.g., spread a plurality of packets). For example, requests made to ports of HTTP, file transfer protocol (FTP), and simple mail transfer protocol (SMTP) may return banners or data with information about the services running on a device to be identified including the versions of software, asset tags, operating system, etc.

Protocol analysis component 208 may further be configured to use cipher suite information to identify a device. For example, if a device uses encryption during communication with a server, the cipher suites (e.g., along with other parameters) supported by the device and communicated to the server prior to establishing the encrypted communication connection can be used in identifying the device. Each of the handshake processes can be used as a fingerprint or indicator for identifying a device. The cipher suite of a particular device may be part of a handshake process with one or more parameters. It is appreciated that the cipher suite information can be exchanged or communicated in binary format according to the SSL protocol packet format specification.

As another example, during a secure sockets layer (SSL) handshake, a client device (e.g., an IoT device) will send a server a preference ordered list of cipher suites that the client supports or is configured to use and the server will return one cipher suite that it selects to use during data communication. The list of supported cipher suites may be unique and can be used to help identify a device. The number of extensions, the extension types, and values can be unique too. The list of supported cipher suites and the number of extensions, the extension types, and values can be used separately or in combination for device identification.

For example, the client device may support thirteen cipher suites including: TLS_ECDME_ECDSA_WITH_AES_128_GCM_SHA256 (0xc02b), TLS_ECDME_RSA_WITH_AES_128_GCM_SHA256 (0xc02f), TLS_ECDME_ECDSA_WITH_AES_256_GCM_SHA384 (0xc02c), TLS_ECDME_RSA_WITH_AES_256_GCM_SHA384 (0xc030), TLS_ECDME_ECDSA_WITH_AES_256_CBC_SHA (0xc00a), TLS_ECDME_ECDSA_WITH_AES_128_CBC_SHA (0xc00a), TLS_ECDME_RSA_WITH_AES_128_CBC_SHA (0xc013), TLS_ECDME_RSA_WITH_AES_256_CBC_SHA (0xc014), TLS_DHE_RSA_WITH_AES_128_CBC_SHA (0x0033), TLS_DHE_RSA_WITH_AES_256_CBC_SHA (0x0039), TLS_RSA_WITH_AES_128_CBC_SHA (0x0020), TLS_RSA_WITH_AES_256_CBC_SHA (0x0035), TLS_RSA_WITH_3DES_EDE_CBC_SHA (0x000a). The client device may further support compression and extensions including: server_name, renegotiation_info and elliptic_curves.

Further, the fact that a device is using encryption can be used in identifying the device. For example, the list of possible device identifications can be narrowed to those that are known to use encryption once it has been determined that a device is using encryption.

Payload analysis component 210 can access and analyze one or more portions of a packet associated with the payload of one or more packets. For example, for a HTTP associated packet, the user-agent string (e.g., including the browser and version being used, operating system, processor, engine information (e.g., rendering engine), JavaScript support, cookie support, device pixel ratio, screen resolution, and browser window size), the URI, and one or more icons can be access and analyzed. The user agent portions associated with the device (e.g., operating system, processor, engine information, browser, etc.) may be used to identify the device or determine possible indicators of device identity. The uniform resource identifier (URI) may provide an indicator of the device identification, e.g., if the device is accessing update.vendor-site.com. Payload analysis component 210 may also determine the browser being used based on the icons as different icons are used by different browsers.

Payload analysis component 210 can also access clear text patterns in the headers of one or more packets used by particular protocols (e.g., SSH and FTP) during the setting up or negotiation a connection. Payload analysis component 210 may further be configured to analyze and make determinations about a payload of one or more packets using proprietary protocols (e.g., operational technology (OT)) including a conveyor belt or medical equipment). For example, if the proprietary protocol is a binary based protocol, payload analysis component 210 may parse the packets and identify the protocol and device properties for use in identifying the device.

In some embodiments, the payload analysis component 210 may access the packet time to live (TTL) value. Different operating systems may use different TTL values which can be used in device identification. For example, Linux™ uses 60 or 64 for the TTL value while Windows™ uses 120 or 128.

Identifier analysis component 212 can analyze one or more packets for unique identifiers and based on the unique identifiers determine device properties including device identification. For example, identifier analysis component 212 may access or select a MAC address from a packet and analyze the organizationally unique identifier (OUI) portion of the MAC address. Identifier analysis component 212 can then set a value of a data structure (e.g., of the data structure 300) based on the OUI portion of the MAC address. This value may then be combined with other values to make a device identification.

A score (e.g., confidence score) can be determined by the packet engine 204 based on the analysis by one or more components of the packet engine 204. The confidence score may then be compared with a threshold associated with a configured accuracy level (e.g., minimum) for device identification.

Device data and analysis data may be sent to the identification engine 240 for comparison with one or more device fingerprints. If a fingerprint is matched, the device identification may be output to the device identification database 242.

Identification engine 240 is configured to determine device identifications based on one or more pieces of data associated with a device to be identified (e.g., combining values) determined by data collection component 202, one or more fingerprints, or a combination thereof. The fingerprints used by identification engine 240 can be updated (e.g., periodically via automated download). In some embodiments, the confidence score may be computed based the extent to which the data determined by the data collection component 202 matches a particular device identification fingerprint. For example, a high confidence score may be determined for data associated with a device to be identified that matches 80% of a stored device fingerprint while a low confidence score may be determined for data associated with a device to be identified that matches 30% of the device fingerprint.

The port engine 220 and advanced detection engine 230 may not be used to make a device identification if enough data is gathered by packet engine 204 to make a device identification. In some embodiments, many devices may be identified based on the packet engine, a small of portion of devices may be identified after running the port engine (e.g., identified based on a combination of the data from the packet engine and the port engine), and very few device may need advanced detection engine data to be identified.

Port engine 220 is configured to actively probe a device to be identified (e.g., using a port scan of each port of the device). Port engine 220 may probe each of the ports of the device to be identified and store data associated with the open and closed ports of the device to be identified. The open and closed ports can then be compared against a local database, a remote database (e.g., an open source database), or combination thereof to determine if the open and closed ports match and existing match an existing device identification or provide a possible identification indicator of the device to be identified. Port engine 220 may use a list of open TCP/UDP ports as a signature to make a determination about a device to be identified. For example, a lighting device could use a particular protocol (associated with a particular port) and have a particular set of ports open that are common to several lighting devices and port engine 220 may determine that that the lighting device is in fact a lighting device based on the particular protocol and particular ports that are open (or closed). The port engine 220 device identifications may further be based on data analysis from the packet engine 204.

In some embodiments, port engine 220 may not scan devices that are potentially sensitive to active port scans. For example, if a hospital network includes a network portion (e.g., network address range) that is known to have devices that are sensitive to port scanning (e.g., either based on user input or device data from the packet engine), then the port engine 220 may skip port scans of devices on that network portion. Port engine 220 may also skip port scans of devices based on device identification indicators determine by packet engine 204. Device identifications by system 200 may thus be based on traffic analysis, thresholds, and network environmental information (e.g., a network portion with devices sensitive to a port scan).

Device port data and port analysis data may be sent to the identification engine 240 for comparison with one or more device fingerprints. If a fingerprint is matched, the device identification may be output to the device identification database 242.

Advanced detection engine 230 may be executed if a device to be identified is not identified based on data from packet engine 204, port engine 220, or combination thereof. In some embodiments, advanced detection engine 230 includes heuristic analysis component 232 and machine learning analysis component 234. It is appreciated that advanced detection engine 230 may include other analytical components than shown.

Heuristic analysis component 232 may analyze a packet size, a packet interval, and a packet sequence (e.g., client and server communication sequence). For example, if a first packet sent from the client to the server is 100 bytes, a second packet sent from the client to the server is 100 bytes, a third packet sent from the server to the client is 99 bytes, this can be a unique traffic sequence of packet sizes can be used to make a device identification or provide a device identification indicator.

Heuristic analysis component 232 be configured to take advantage of the fact that for network traffic communications transferring the same payload (e.g., layer 7 payload), different devices and device types may choose different packet sizes and intervals (e.g., trackable based on timestamp). For example, the network traffic between an IoT device and a server where the IoT device sends a packet to the server which is followed by a packet from the server to the client (e.g., with a particular interval between packets) can be a unique pattern that can be used to identify the device. As another example, if three packets are sent from the client to server and then the server sends a response, the time interval could be used to identify the client device. The intervals for devices can be very different for different devices. Heuristic analysis component 232 may use the interval of time between the first packet and the second packet as a parameter for determining a device identification.

Heuristic analysis component 232 may further use power consumption associated with a device in identifying the device. For example, heuristic analysis component 232 may use a power consumption value associated with a device from a power over Ethernet (PoE) network device (e.g., network switch) along with other values discussed herein, to determine a device identification or device identifications indicators.

Heuristic analysis component 232 may further use the time interval and size of heartbeat or polling communications of a device. For example, some devices (e.g., IoT devices) may regularly send heartbeat communications to a server or cloud based system (e.g., to maintain a communication connection). The heartbeat communications of various devices may vary among devices allowing the time intervals and packets sizes to be used for device identification.

In some embodiments, heuristic analysis component 232 is configured to determine and analyze derivatives of heuristics data (e.g., second or higher order heuristics) for device identification. For example, the speed of a communication of data can be computed based on the size of data transferred over a period of time which may be unique to a device.

Machine learning analysis component 234 may be use deep learning to determine new fingerprints (e.g., of various DHCP options and parameters). Machine learning analysis component 234 may be trained using a large data set of network traffic.

The machine learning may be based on data or analysis of any of the components (e.g., DHCP analysis component 206, protocol analysis component 208, payload analysis 210, identifier analysis component 212, and port analysis component 222) of data collection component 202.

Machine learning analysis component 234 may utilize data from packet engine 204, port engine 220, and heuristic analysis component 232 (e.g., including derivatives of heuristics). In some embodiments, machine learning analysis component 234 may use offline training data that was captured in a controlled environment to isolate traffic of one or more particular devices to be used by machine learning analysis component 234 to identify devices (e.g., coupled to network 100). Machine learning analysis component 234 may further use one or more device signatures (e.g., accessed (e.g., downloaded) by data collection component 202) for signature based device identifications. The machine learning analysis component 232 may perform active or real-time machine learning analysis.

The offline training data could also include previous or historical network traffic (e.g., of network 100 captured and analyzed by packet engine 204 and advance detection engine 232) that can be used to train machine learning analysis component 234 to identify particular devices. For example, ten, twenty, or 100 raw attributes may be used for machine learning training to determine a combination of the raw attributes. A combination of the raw attributes (e.g., based on a model) can be used to calculate a cost function. Particular raw attributes can be used to calculate a cost value based on the cost function. This cost value can be used as a fingerprint of a particular device. The model can be based on any previously received data including data based on heuristic analysis (e.g., by heuristic analysis component 232).

For example, the raw attributes may include: a=packet size, b=time interval, and c=number of cipher suites, the cost function may be based on a non-linear polynomial, e.g., $a^2+b^2+c$, depending on the model used. The raw attribute values (e.g., inputs) may be used along with the cost function to determine a cost value for a particular device.

Device data and analysis data by advanced detection engine 230 may be sent to the identification engine 240 for comparison with one or more device fingerprints. If a fingerprint is matched, the device identification may be output to the device identification database 242.

It is appreciated that the modular nature of system 200 may allow the components to be upgraded independently without affecting other components and allow flexibility to enable or disable individual components thereby providing scalability and extensibility.

Each of the engines of data collection component 202 may be used to determine a device identification. For example, if the device to be identified is an IoT sensor operating with a Raspberry Pi™ (an embedded system). DHCP analysis component 206 analyzes the DHCP v4 parameter list which is [1, 3, 12, 15, 6, 33, 121, 42, 101] which matches the fingerprint of Rasbian, an operating system used in Raspberry Pi™. The protocol and the layer 7 packet payload may then be checked. The protocol analysis component 208 may detected a specific communication protocol used by Raspberry Pi™ which further indicates that it is a Raspberry Pi™ device and the operating system is Rasbian. The payload analysis component 210 can access HTTP traffic with a user-agent of "ABC Sensor Model 123." This can indicate that the device may be a sensor and related to vendor ABC. Identifier analysis component 212 may analyze the MAC address (e.g., OUI portion) of the device to be identified and determine that the MAC address is associated with vendor ABC. Thus, based on the packet engine 204 analysis there may be enough information to conclude that the operating system of the device is Rasbian and the vendor is ABC.

However, the confidence score of the product information may not reach the product threshold. Port engine 220 may then be run to perform a port scan and compare the results against an open port/closed port database. The results may include some keywords of "Sensor," while this may contribute to the confidence score at the product level it may still not reach the product threshold. Advanced detection engine 230 may then be executed and compares the packet size and packet sequence to previous training data and determine that it matches the fingerprint (e.g., based on communication with the identification engine 240) of a temperature sensor. The device identification can then be output and stored in device information database 242.

In some embodiments, the system 200 may be software stored on a non-transitory computer readable medium having instructions encoded thereon that, when executed by a processing device, cause the processing device to: access a packet of a communication associated with a device coupled to a network and determine a first plurality of values associated with a plurality of respective portions of the packet. For example, the first plurality of values may be determined based on packet analysis (e.g., by packet engine 204). The instructions may further cause the processing device to scan one or more ports of the device and determine a second plurality of values (e.g., by port engine 220) associated with the one or more ports of the device. The instructions may further cause the processing device to determine a third plurality of values (e.g., by advanced detection engine 230) associated with a heuristic and access a threshold value. The instructions may further cause the processing device to determine a device identification of the device (e.g., by one or more of the engines of data collection component 202, identification engine 240, or a combination thereof) based on the first plurality of values, the second plurality of values, the third plurality of values, and the threshold value and store the device identification.

In some embodiments, the heuristic is associated with at least one of a size of the packet, an interval associated with a plurality of packets comprising the packet, or a sequence of packets comprising the packet. In various embodiments, the heuristic is associated with a heartbeat communication comprising the packet. In some embodiments, the third plurality of values is further associated with a power consumption of the device. In various embodiments, the third plurality of values is further associated with machine learning (e.g., by machine learning analysis component 234).

In some embodiments, a system may include a memory and a processing device, operatively coupled to the memory. The processing device to access a packet of a communication associated with a device coupled to a network and determine a first plurality of values associated with a plurality of respective portions of the packet (e.g., by packet engine 204). The processing device further to access a first threshold value associated with the plurality of respective portions of the packet and scan one or more ports of the device (e.g., by port engine 220). The processing device further to determine a second plurality of values (e.g., by port engine 220) associated with the one or more ports of the device and access a second threshold associated with the one or more ports of the device. The processing device further to determine a device identification of the device (e.g., by one or more of the engines of data collection component 202, identification engine 240, or a combination thereof) based on the first plurality of values, the second plurality of values, the first threshold value, and the second threshold value and store the device identification.

In some embodiments, the determination of the first plurality of values associated with the respective portions of the packet comprises passive packet analysis (e.g., by packet engine 204). In various embodiments, the determination of the second plurality of values associated with the one or more ports of the device is based on an active port analysis (e.g., by port engine 220). A value of the second plurality of values may be based on at least one of: one or more transmission control protocol (TCP) ports open on the device or one or more user datagram protocol (UDP) ports open on the device. In some embodiments, the first threshold is associated with at least one of an operating system, a vendor, or a product of the vendor.

Figure 3:
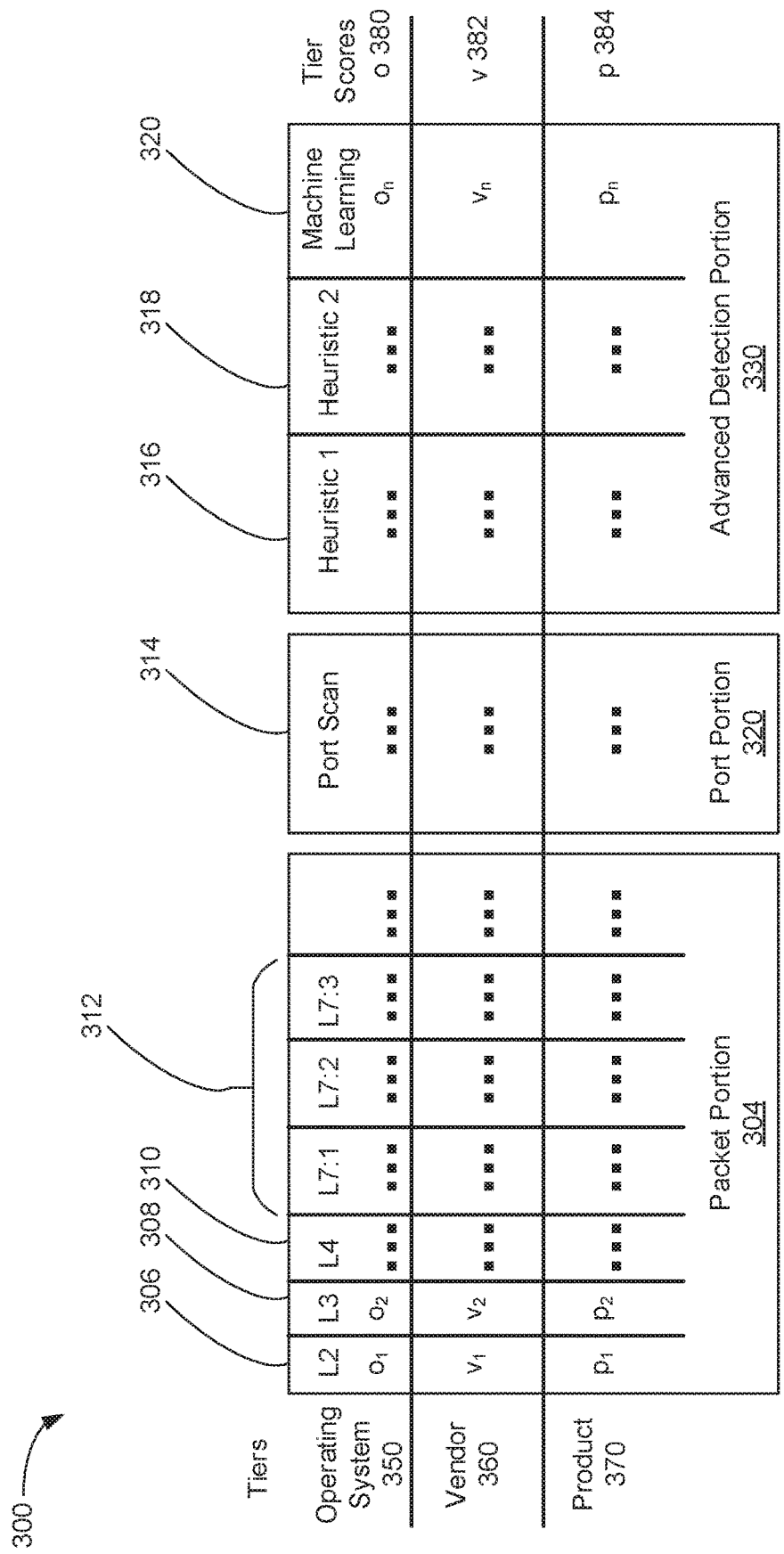
FIG. 3 depicts an exemplary data structure of device information operable for use in device identification in accordance with aspects and implementations of the present disclosure.

FIG. 3 depicts an exemplary data structure of device information operable for use in device identification in accordance with aspects and implementations of the present disclosure. Score matrix 300 is an example data structure that may be used by some embodiments to store values for one or more tiers and calculate confidence scores for use in device identification (e.g., based on a comparison to a threshold).

The score matrix 300 includes a packet portion 304, a port portion 320, and an advanced detection portion 330. For each of the columns in packet portion 304, a port portion 320, and an advanced detection portion 330, score matrix 300 has rows associated with respective tiers: operating system tier 350, vendor tier 360, and product tier 370. Values for each of the columns may be stored according to the respective tiers. For example, the value of $o_1$ can be set according to a layer 2 portion of a packet that may indicate the operating system. As another example, for the operating system tier 350 and column 306, the value may be assigned based on a packet of the device indicating the device is using embedded Microsoft Windows XP™.

It is appreciated that embodiments may support more or less columns or rows than shown and may support more or less values and scores than shown. It is further appreciated that while values or scores for each tier go from 1-n, the number of values or scores may be any number and could be dynamically adjusted.

The packet portion 304 values and scores are computed based on packet analysis (e.g., by packet engine 204). Packet portion 304 includes layer 2 (L2) column 306, layer 3 (L3) column 308, layer 4 (L4) column 310, and layer 7 columns 312 (e.g., L7:1, L7:2, L7:3).

L2 column 306 can be used to store values and scores related to layer 2 portions of one or more packets for the operating system tier 350, vendor tier 360, and product tier 370. L2 column 306 values can be based on layer 2 information, e.g., frame size, protocol type. For example, if the layer 2 information indicates that the protocol is the Cisco™ discovery protocol (CDP), the $o_1$ value of the L2 column 306 may be set based on the operating system being Linux. The $v_1$ value of the L2 column 306 can be set based on the vendor being Cisco™ based on the operating system being Linux and the CDP protocol being used. As another example, the $p_1$ value may be based on a device using a product specific proprietary operating system.

L3 column 308 can be used to store values related to layer 3 portions of one or more packets for the operating system tier 350, vendor tier 360, and product tier 370. For example, L3 column 308 values can be based on layer 3 information of IP protocol, TTL, etc. L4 column 310 can be used to store values related to layer 4 portions of one or more packets for the operating system tier 350, vendor tier 360, and product tier 370. For example, L4 column 310 values can be based on layer 4 information including whether the TCP or the UDP protocol is being used and the port being used. L7 columns 312 can be used to store values related to layer 7 portions of one or more packets for the operating system tier 350, vendor tier 360, and product tier 370. For example, L7 columns 312 values can be based on layer 7 application layer payload information including a user-agent, a URL name, a content-type, etc.

The port portion 320 can be used to store values and scores are computed based on port analysis (e.g., by port engine 220). Port portion 320 includes port scan column 314. Port scan column 314 can be used to store values related to the results of a port scan of a device to be identified for the operating system tier 350, vendor tier 360, and product tier 370 and can further be based on comparing the open and closed ports on the device to a database (e.g., local or remote).

The advanced detection portion 330 can be used to store values and scores may be determined based on heuristics, machine learning or training, or a combination thereof (e.g., by advanced detection engine 230). Advanced detection portion 330 includes heuristic columns 316-318 and machine learning column 320. Heuristic columns 316-318 can be used to store values or scores related to various heuristics of one or more packets (e.g., packet size, packet intervals, and packet sequence). The values or scores of the heuristic columns 316-318 may be used to store values or scores determined by heuristic analysis component 232. Heuristic columns 316-318 may also be used to store values or scores based on derivatives of heuristics (e.g., second order, third order, etc., derivatives of heuristic data). Machine learning column 320 can be used to store values or scores based on machine learning analysis or training performed on data associated with the device to be identified, as described herein.

Various weights may be applied to the values, e.g., multiplied, of score matrix 300. For example, the weight applied to a layer 7 value may be higher based on the attribute more accurately being usable to identify a device. As another example, a weight of two maybe applied (e.g., multiplied) to a layer 7 attribute that indicates a particular application, while a weight of 1.2 may be applied (e.g., multiplied) to other layer attributes or values. The weights may be trained offline, predetermined, tuned over time, or a combination thereof. The weights and thresholds may be tuned offline and independently updated.

Once the scores for the overall packet portion fields or cells are determined then a confidence score may be determined for the packet portion. A confidence score may be calculated based on a combination of one or more of the values of the packet portion of the score matrix 300. The device or system (e.g., system 200) performing the device identification may use an algorithm (e.g., configurable) to compute the confidence score. The system performing the device identification may maintain a score matrix 300 for each device. Based on the value of each column property of score matrix 300, a confidence score of each of the tiers, operating system tier 350, vendor tier 360, and product tier 370, may be calculated.

The product tier confidence score may then be compared against a product threshold to determine whether a reliable device identification has been made. If the threshold is not met by the confidence score, then values of the other portions of the score matrix 300 may be determined (e.g., port portion 320 and advanced detection portion 330).

In some embodiments, the values of port portion 320 and advanced detection portion 330 are optionally determined. The execution of other engines (e.g., port engine 220 and advanced detection engine 230) after the packet engine 204 can be based on the whether the confidence score of the packet portion is above the threshold. The determination of values of port portion 320 may be based on whether the device being identified is sensitive to active port scans (e.g., based on user input or based on indicators or values of packet portion 304 as determined based on data collected by packet engine 204).

Based on the scores of each row, tier scores 380-384 may be determined. Operating system tier score 380 can be determined based on each of values of columns 306-320 (e.g., $o_1$-$o_n$) for the operating system tier 350 (row). Vendor tier score 382 can be determined based on each of values of columns 306-320 (e.g., $v_1$-$v_n$) for the vendor tier 360 (row). Product score 382 can be determined based on each of values of columns 306-320 (e.g., $p_1$-$p_n$) for the product tier 370 (row). There may be respective thresholds for each of the operating system tier 350, vendor tier 360, and product tier 370. In some embodiments, if a score based on the values of the packet portion 304 do not meet or exceed a threshold associated with the product tier 370, then the values of the port portion 320 and advanced detection 330 may be determined.

The confidence score algorithm can be tuned (e.g., offline or in real-time) and can also be updated on-the-fly as a content update. For example, the confidence score algorithm can be updated as part of a software library update.

Figure 4:
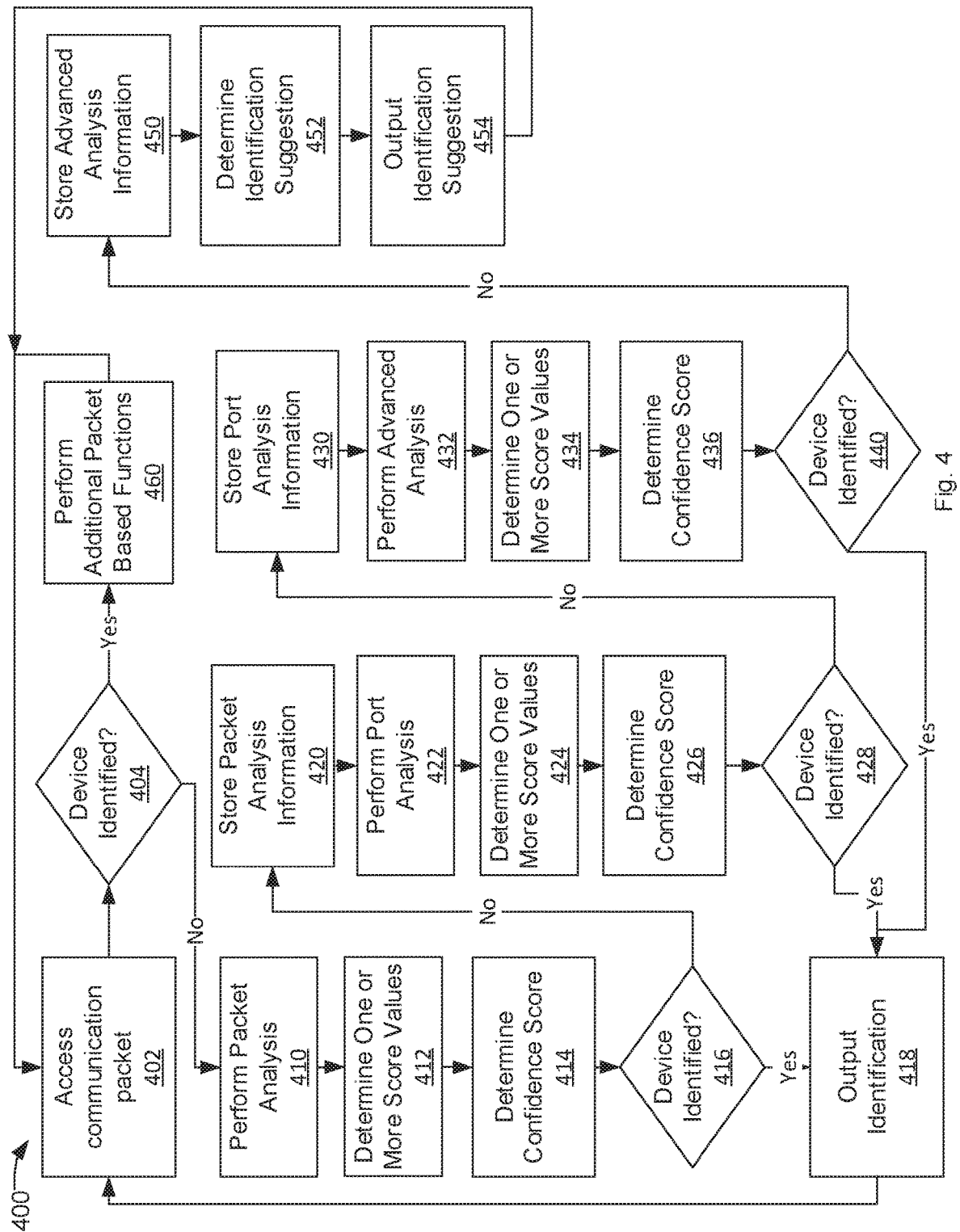
FIG. 4 depicts a flow diagram of aspects of a method for device classification in accordance with one implementation of the present disclosure.

With reference to FIG. 4, flowchart 400 illustrates example functions used by various embodiments. Although specific function blocks ("blocks") are disclosed in flowchart 400, such blocks are examples. That is, embodiments are well suited to performing various other blocks or variations of the blocks recited in flowchart 400. It is appreciated that the blocks in flowchart 400 may be performed in an order different than presented, and that not all of the blocks in flowchart 400 may be performed.

FIG. 4 depicts a flow diagram of aspects of a method for device identification in accordance with one implementation of the present disclosure. Various portions of flowchart 400 may be performed by different components, e.g., packet engine 204, port engine 220, advanced detection engine 230, and identification engine 240.

At block 402, a communication packet is accessed. The packet may be sent from or to a device (e.g., devices 120-130) communicatively coupled to a network (e.g., network 100). The packet may be accessed via a network device (e.g., network device 104) that facilitates communication among multiple network devices. For example, the packet may be accessed by a packet engine (e.g., packet engine 204) that may access a portion of the packet, examine a particular layer portion of the packet or examine one property of the packet in the particular layer. In some embodiments, the packet may be accessed based on detecting the device in response to the device being coupled to the network.

In some embodiments, one or more packets may be skipped. For example, where a large download (e.g., three Gigabytes) has been initiated, the first few packets may be accessed while subsequent packets may not be accessed (e.g., for identification purposes).

At block 404, whether the device associated with the packet has been identified is determined. This may be determined by accessing a device identification data structure (e.g., device information database 242) and comparing a unique identifier in the packet to the device identification data structure. If the device associated with the packet has been identified (e.g., previously), block 460 is performed. If the device associated with the packet has not been identified, block 410 is performed.

At block 410, packet analysis is performed. The packet analysis may be performed by a packet analysis component (e.g., packet engine 204). The packet analysis can include accessing one or more portions of one or more packets, as described herein. The packet analysis can include DHCP analysis, protocol analysis, payload analysis, and identifier analysis.

At block 412, one or more score values are determined. The one or more score values can be determined based on the one or more portions of the one or more packets accessed during packet analysis. For example, a score value may be set based on a layer 7 property having a strong identification indication of the device that sent the packet. As another example, a score value may be set based on a particular port being listed in the packet. The one or more score values may be part of a score matrix (e.g., score matrix 300) and associated with various tiers (e.g., tiers 350-370), as described herein. The one or more scores may be determined based on a weighting applied to the scores, as described herein.

At block 414, a confidence score is determined. The confidence score can be determined based on a combination of the one or more score values, as described herein. The confidence score may be associated with one or more tiers of identification (e.g., tiers 350-370).

At block 416, whether the device has been identified is determined. The determination of whether a device has been identified can be determined based on whether the confidence score meets or exceeds a threshold, as described herein. If the confidence score meets or exceeds the threshold, the device has been identified, then block 418 is performed. If the confidence score does meet the threshold, the device has not been identified, then block 420 is performed.

At block 418, the device identification is output. The device identification may be stored for future access (e.g., by another program or module), displayed as part of a graphical user interface (GUI), etc. For example, the device identification may be displayed as part of a group of similar devices or presented as part of a notification. The device identification may also be used for implementing a policy (e.g., security policy) to the device based on the device identification. For example, the device identification may include being an internet protocol (IP) camera made by Vendor A and Model 123, the device identity may be used to apply a security policy to each device from Vendor A or each device that is Model 123. As another example, the device identification may be used to monitor and control network access of the device based on network traffic patterns (e.g., expected traffic patterns). The device identification can be used for applying quality of service (QoS) controls to particular devices or applications (e.g., particular devices running particular applications). The device identification may further be used for incident response. For example, if a new vulnerability is found for a specific device, action (e.g., a security action to restrict network communication of the device) can be taken automatically based on the device identification.

The device identification can further be used for network segmentation and visualization, etc. For example, a network portion with a particular device can be segmented (e.g., access restricted) from one or more other network portions. As another example, device identifications of one or more devices may be indicated visually as part of a GUI with one or more icons based on the device identification (e.g., device type, manufacturer logo, etc.).

At block 420, packet analysis information is stored. The packet analysis information may include the one or more scores values determined and one or more confidence scores, as described herein. The information stored may be stored for use in determining a device identification based on the stored information and additional information (e.g., from port engine 220 or advanced detection engine 230).

At block 422, port analysis is performed. As described herein, the port analysis may include a port scan of a device to be identified. In some embodiments, the port analysis may be optional or skipped if the device to be identified is possibly sensitive to port scanning (e.g., based on the packet analysis) and block 432 may be performed.

At block 424, one or more score values are determined. The one or more score values are determined based on open and closed ports (e.g., TCP/UDP ports) determined based on the port analysis. For example, a score value may be based on a particular port being open on the device to be identified. The one or more score values may be part of a score matrix (e.g., score matrix 300) and associated with various tiers (e.g., tiers 350-370), as described herein. The one or more scores may be determined based on a weighting applied to the scores, as described herein.

At block 426, a confidence score is determined. The confidence score can be determined based on a combination of the one or more score values determined, as described herein. The confidence score may be associated with one or more tiers of identification (e.g., tiers 350-370). The confidence score may further be based on scores associated with the packet analysis and associated with the port analysis.

At block 428, whether the device has been identified is determined. The determination of whether a device has been identified can be determined based on whether the confidence score meets or exceeds a threshold. If the confidence score meets or exceeds the threshold then the device has been identified, then block 418 is performed. If the confidence score does meet the threshold then the device has not been identified, then block 430 is performed.

At block 430, port analysis information is stored. The port analysis information may include the one or more scores values determined and the confidence score, as described herein. The information stored may be stored for use in determining a device identification based on the stored information and additional information (e.g., from advanced detection engine 230).

At block 432, advanced analysis is performed (e.g., advanced detection engine 230). As described herein, the advanced analysis may include heuristics and machine learning analysis of a device to be identified. In some embodiments, the advanced analysis may be performed if the device to be identified is possibly sensitive to port scanning, as described herein.

At block 434, one or more score values are determined. The one or more score values are determined based on the heuristics or machine learning analysis, as described herein. For example, a score value may be based on the size of one or more packets, intervals between the packets, and sequence of packets. The one or more score values may be part of a score matrix (e.g., score matrix 300) and associated with various tiers (e.g., tiers 350-370), as described herein. The one or more scores may be determined based on a weighting applied to the scores, as described herein.

At block 436, a confidence score is determined. The confidence score can be determined based on a combination of the one or more score values determined, as described herein. The confidence score may be associated with one or more tiers of identification (e.g., tiers 350-370). The confidence score may further be based on scores associated with the packet analysis and associated with the port analysis.

At block 440, whether the device has been identified is determined. The determination of whether a device has been identified can be determined based on whether the confidence score meets or exceeds a threshold. If the confidence score meets or exceeds the threshold, the device has been identified, then block 418 is performed. If the confidence score does meet the threshold, the device has not been identified, then block 450 is performed.

At block 450, advanced analysis information is stored. The advanced analysis information may include the one or more scores values determined and the confidence score, as described herein. The information stored may be stored for use in future device identification processes based on the stored information and additional information (e.g., from packet engine 204, port engine 220, advanced detection engine 230, or a combination thereof). The advanced analysis information may further be used for determining a suggested device identification.

At block 452, an identification suggestion is determined. The identification suggestion may be the mostly likely identification of the device based on the packet analysis, port analysis, and advanced analysis information.

At block 454, the identification suggestion is output. The identification suggestion may be stored or displayed as part of a GUI. The identification suggestion may be displayed as a portion of a message to user prompting the user to confirm the identification suggestion or provide additional information (e.g., to identify the device).

At block 460, one or more additional packet based functions are performed. The packet based functions performed may other functions of the packet engine separate or different from identification (e.g., security, traffic blocking, etc.). The other functions performed can include determining applications running on the device, determining vulnerabilities of the device, and user information associated with the device (e.g., which user is logged into the machine).

In some embodiments, the device identification process is performed using packet analysis (e.g., by the packet engine 204), port analysis (e.g., by the port engine 220), and advanced detection analysis (e.g., by the advanced detection engine 230) in a serialized fashion. In response to the three tiers of information (e.g., tiers 350-370) being confirmed within a confidence threshold, the identification process can stop to result in savings in terms of identification time and CPU usage. For example, if the packet engine can identify the device with a high confidence score, the identification process can stop without using the port engine and the advanced detection engine. Similarly, if packet engine data along with port analysis data, as determined by the port engine, can identity the device with a high confidence score, the identification can complete without using the advanced detection engine.

Processing power and time may vary based on each engine. For example, the packet engine may take less processing and time than the port engine, the port engine may use less processing power than the advanced detection engine.

Figure 5:
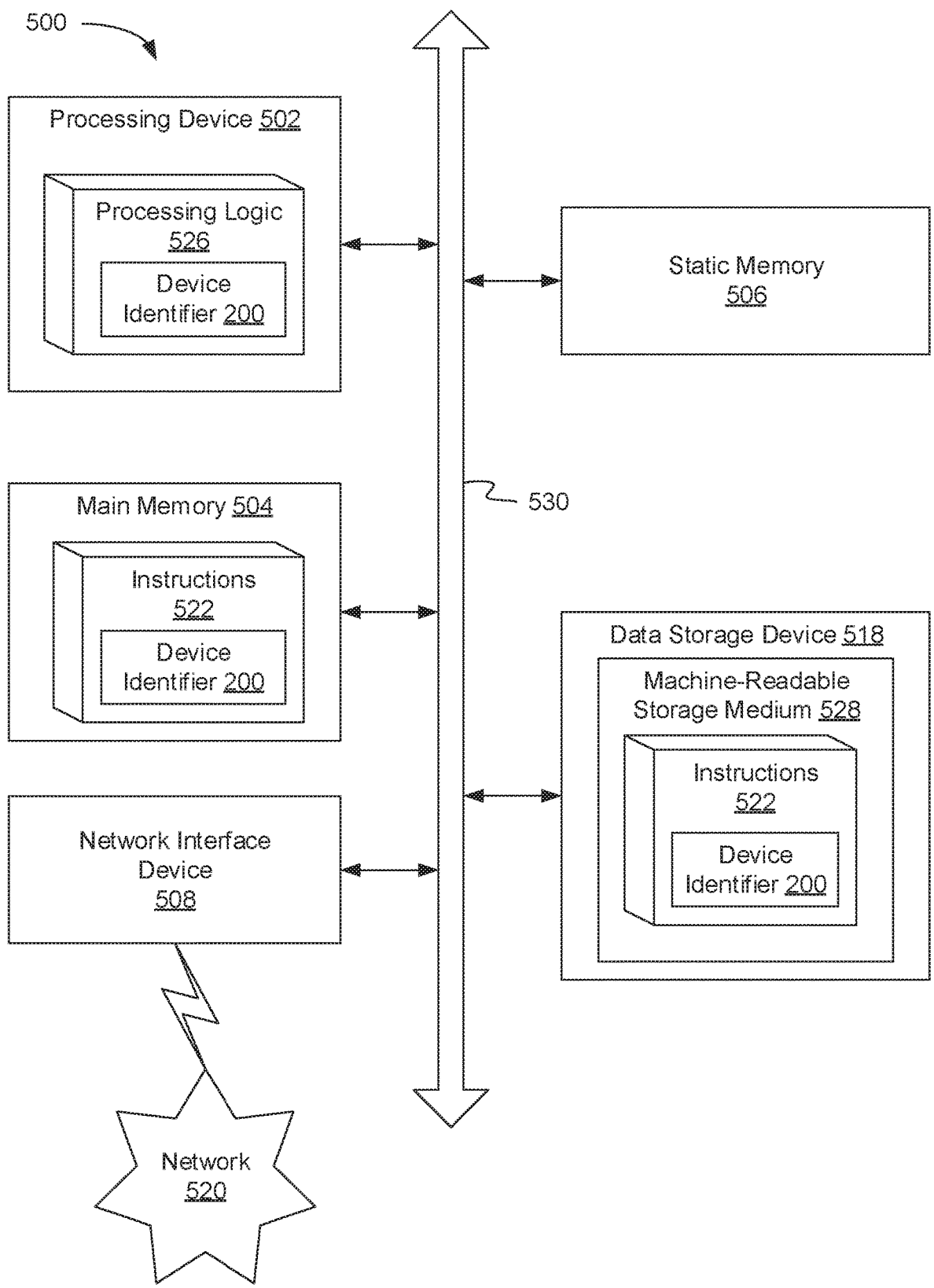
FIG. 5 is a block diagram illustrating an example computer system, in accordance with one implementation of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as network monitor device 102 configured to perform device identification or system 200.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of system 200 shown in FIG. 2, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute device identifier 200. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for device identification, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A system comprising:
a memory; and
a processing device, operatively coupled to the memory, to:
 access a packet of a communication associated with a device coupled to a network;
 determine a first plurality of values associated with a plurality of respective portions of the packet;
 access a first threshold value associated with the plurality of respective portions of the packet;
 determine a first confidence score associated with the first plurality of values;
 compare the first confidence score with the first threshold value;
 in response to the first confidence score being less than the first threshold value, scan one or more ports of the device;
 determine a second plurality of values associated with the one or more ports of the device;
 access a second threshold associated with the one or more ports of the device;
 determine a second confidence score associated with the first and second plurality of values;
 perform a device identification determination of the device based on a comparison of the second confidence score and the second threshold;
 in response to the device being identified:
  store the device identification; and
  apply a security policy based on the device identification;
 in response to the device not being identified;
  determine an identification suggestion based on analysis information; and
  output the identification suggestion.

2. The system of claim 1, wherein the determination of the first plurality of values associated with the respective portions of the packet comprises passive packet analysis.

3. The system of claim 2, wherein the determination of the second plurality of values associated with the one or more ports of the device is based on an active port analysis.

4. The system of claim 1, wherein a value of the second plurality of values is based on at least one of: one or more transmission control protocol (TCP) ports open on the device or one or more user datagram protocol (UDP) ports open on the device.

5. The system of claim 1, wherein the first threshold is associated with at least one of an operating system, a vendor, or a product of the vendor.

6. A non-transitory computer readable medium having instructions encoded thereon that, when executed by a processing device, cause the processing device to:
 access a packet of a communication associated with a device coupled to a network;
 determine a first plurality of values associated with a plurality of respective portions of the packet;
 determine a first confidence score associated with the first plurality of values;
 access a threshold value;
 compare the first confidence score with the threshold value;
 in response to the first confidence score being less than the threshold value:
  scan one or more ports of the device; and
  determine a second plurality of values associated with the one or more ports of the device;
 determine a second confidence score associated with the first plurality of values and the second plurality of values;
 compare the second confidence score with the threshold value;
 in response to the second confidence score being less than the threshold value:
  determine a third plurality of values associated with a heuristic;
 determine a third confidence score associated with the first plurality of values, the second plurality of values, and the third plurality of values;
 perform, by the processing device, a device identification determination of the device based on a comparison of the third confidence score and the threshold value;
 in response to the device being identified:
  store the device identification; and
  apply a security policy based on the device identification; and
 in response to the device not being identified;
  determine an identification suggestion based on analysis information; and
  output the identification suggestion.

7. The non-transitory computer readable medium of claim 6, wherein the heuristic is associated with at least one of a size of the packet, an interval associated with a plurality of packets comprising the packet, or a sequence of packets comprising the packet.

8. The non-transitory computer readable medium of claim 6, wherein the heuristic is associated with a heartbeat communication comprising the packet.

9. The non-transitory computer readable medium of claim 6, wherein the third plurality of values is further associated with a power consumption of the device.

10. The non-transitory computer readable medium of claim 6, wherein the third plurality of values is further associated with machine learning.

* * * * *